(12) United States Patent
Hall

(10) Patent No.: US 12,348,837 B2
(45) Date of Patent: *Jul. 1, 2025

(54) SYSTEMS AND METHODS FOR PROVIDING ADVERTISEMENTS IN LIVE EVENT BROADCASTING

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/798,339

(22) Filed: Aug. 8, 2024

(65) Prior Publication Data

US 2024/0406516 A1 Dec. 5, 2024

Related U.S. Application Data

(63) Continuation of application No. 17/870,236, filed on Jul. 21, 2022, now Pat. No. 12,075,135, which is a continuation of application No. 17/177,820, filed on Feb. 17, 2021, now Pat. No. 11,399,220, which is a continuation of application No. 16/407,705, filed on May 9, 2019, now Pat. No. 10,932,010.

(60) Provisional application No. 62/670,002, filed on May 11, 2018.

(51) Int. Cl.
*H04N 21/81* (2011.01)
*G06Q 30/0273* (2023.01)
*H04N 21/2187* (2011.01)

(52) U.S. Cl.
CPC ....... *H04N 21/812* (2013.01); *G06Q 30/0275* (2013.01); *H04N 21/2187* (2013.01)

(58) Field of Classification Search
CPC ............ H04N 21/812; H04N 21/2187; G06Q 30/0275
See application file for complete search history.

(56) References Cited

U.S. PATENT DOCUMENTS

| | | |
|---|---|---|
| 7,856,372 B2 | 12/2010 | Ullah |
| 7,856,373 B2 | 12/2010 | Ullah |
| 8,060,399 B2 | 11/2011 | Ullah |
| 8,572,639 B2 | 10/2013 | Ficco |
| 8,819,726 B2 | 8/2014 | Wetzer et al. |
| 9,060,210 B2 | 6/2015 | Packard et al. |
| 10,405,044 B1 | 9/2019 | Seely et al. |
| 2004/0117819 A1 | 6/2004 | Yu |
| 2006/0026628 A1 | 2/2006 | Wan et al. |
| 2007/0157260 A1 | 7/2007 | Walker |
| 2008/0167943 A1* | 7/2008 | O'Neil .................. G06Q 30/08 705/7.29 |
| 2008/0189215 A1* | 8/2008 | Travez .................. G06Q 30/02 725/32 |
| 2009/0210395 A1* | 8/2009 | Sedam .................... H04W 4/00 |
| 2009/0320061 A1 | 12/2009 | Pettit et al. |

(Continued)

*Primary Examiner* — Sumaiya A Chowdhury
(74) *Attorney, Agent, or Firm* — NEO IP

(57) ABSTRACT

Systems and methods for real-time bidding of advertisement during live event broadcasting are disclosed including calculating intensity levels during a live event, opening advertisement space on screen for real-time bidding based on intensity levels, and displaying an advertisement in the advertisement space as an overlay on video images of the live event broadcasting.

19 Claims, 1 Drawing Sheet

(56) References Cited

U.S. PATENT DOCUMENTS

| | | |
|---|---|---|
| 2010/0114716 A1* | 5/2010 | Heilig .................... G06Q 30/08 |
| | | 705/14.71 |
| 2011/0039624 A1* | 2/2011 | Potkonjak ............... A63F 13/57 |
| | | 463/43 |
| 2011/0102678 A1 | 5/2011 | House et al. |
| 2011/0258049 A1 | 10/2011 | Ramer et al. |
| 2012/0180084 A1 | 7/2012 | Huang et al. |
| 2012/0215640 A1 | 8/2012 | Ramer et al. |
| 2014/0064693 A1* | 3/2014 | Deshpande ........ H04N 21/4828 |
| | | 386/230 |
| 2014/0082648 A1 | 3/2014 | Tanner et al. |
| 2014/0278847 A1* | 9/2014 | Gallo ................. G06Q 30/0252 |
| | | 705/14.5 |
| 2015/0215605 A1 | 7/2015 | Stephan |
| 2015/0358680 A1 | 12/2015 | Feldstein et al. |
| 2016/0132941 A1 | 5/2016 | Han et al. |
| 2017/0193548 A1* | 7/2017 | Pacella ............. G06Q 30/0251 |
| 2017/0193563 A1 | 7/2017 | Kumar et al. |
| 2018/0054659 A1* | 2/2018 | Goswami ............. H04N 13/243 |
| 2018/0198836 A1* | 7/2018 | Baryla .................... H04L 65/80 |
| 2019/0213627 A1* | 7/2019 | Rudnick ............. H04N 21/251 |
| 2019/0349643 A1 | 11/2019 | Hall |
| 2021/0176535 A1 | 6/2021 | Hall |
| 2022/0360864 A1 | 11/2022 | Hall |

\* cited by examiner

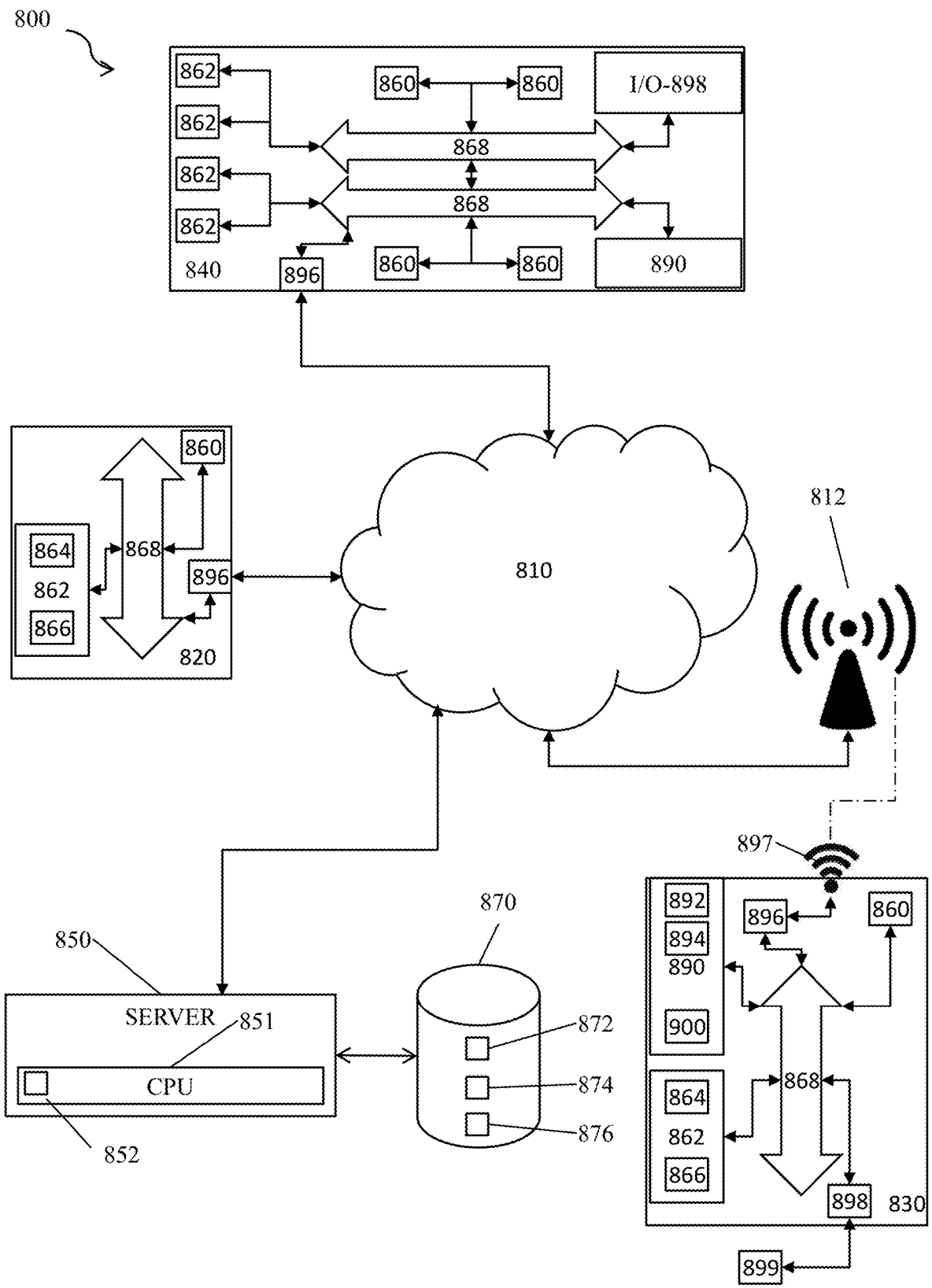

SYSTEMS AND METHODS FOR PROVIDING ADVERTISEMENTS IN LIVE EVENT BROADCASTING

CROSS-REFERENCE TO RELATED APPLICATIONS

This application relates to and claims priority from the following U.S. Applications. This application is a continuation of U.S. patent application Ser. No. 17/870,236, filed Jul. 21, 2022, which is a continuation of U.S. patent application Ser. No. 17/177,820, filed Feb. 17, 2021 and issued as U.S. Pat. No. 11,399,220, which is a continuation of U.S. patent application Ser. No. 16/407,705, filed May 9, 2019 and issued as U.S. Pat. No. 10,932,010, which claims the benefit of and priority to U.S. Provisional Patent Application No. 62/670,002, filed May 11, 2018, each of which are incorporated herein by reference in their entirety.

BACKGROUND OF THE INVENTION

1. Field of the Invention

The present invention relates to systems and methods for inserting advertisements during live sporting event broadcasting. More particularly, the present invention relates to systems and methods for providing dynamic layered graphic elements for advertising in live sports broadcasting.

2. Description of the Prior Art

Exemplary US Patent Documents relevant to the prior art include:

U.S. Pat. No. 7,856,372 for "Targeting content to internet enabled radio devices" by Shah Ullah, filed Oct. 28, 2007 and issued Dec. 21, 2010, describes methods and systems for managing content, including advertising content, delivered to various network-connected devices, including screens, mobile devices, computers, televisions, radios, and the like, based on usage profiles associated with device-specific identifiers for mobile devices, short-distance wireless technologies for transmission of content and detection of proximity, and content targeting and management techniques.

U.S. Pat. No. 7,856,373 for "Targeting content to network-enabled devices based upon stored profiles" by Shah Ullah, filed Oct. 28, 2007 and issued Dec. 21, 2010, describes methods and systems for managing content, including advertising content, delivered to various network-connected devices, including screens, mobile devices, computers, televisions, radios, and the like, based on usage profiles associated with device-specific identifiers for mobile devices, short-distance wireless technologies for transmission of content and detection of proximity, and content targeting and management techniques.

U.S. Pat. No. 8,060,399 for "Targeting content to network-enabled television devices" by Shah Ullah, filed Mar. 4, 2011 and issued Nov. 15, 2011, describes methods and systems for managing content, including advertising content, delivered to various network-connected devices, including screens, mobile devices, computers, televisions, radios, and the like, based on usage profiles associated with device-specific identifiers for mobile devices, short-distance wireless technologies for transmission of content and detection of proximity, and content targeting and management techniques.

U.S. Pat. No. 8,572,639 for "Broadcast advertisement adapting method and apparatus" by Michael Ficco et al., filed Jan. 26, 2005 and issued Oct. 29, 2013, describes techniques of adapting an advertisement previously broadcast or in the process of being broadcast. An advertisement selection factor is generated in order to adapt ads to a particular recipient. The advertisement selection factor can be derived from a database of information concerning the recipient and/or from data input by the recipient. The ad may be adapted in a variety of ways including replacing a broadcast ad segment with another segment. The replacement ad segment may be stored in a local device such as a set-top box or hardware card of a TV or PC and selected according to the advertisement selection factor. The replacement ad segment is synchronized with the on-going broadcast to produce a seamless ad. Alternatively, an ad processing can change audio or visual characteristics of the ad according to the ad selection factor. Such ad processing also includes dynamical texture mapping, object replacement, object addition, and audio/video data layering. The ad processing may also be combined with ad segment replacement. The result is a broadcast advertisement specifically targeted for a recipient and thereby likely to have a greater impact on that recipient's buying patterns. These techniques may also be applied to a variety of content such as sitcoms and sports shows to adapt the content to a particular recipient.

U.S. Pat. No. 8,819,726 for "Methods, apparatus, and systems for presenting television programming and related information" by Michael Wetzer et al., filed Oct. 14, 2011 and issued Aug. 26, 2014, describes methods and apparatus for providing advertising information on a second user viewing device relating to a media program viewed on a first user viewing device. Upon determining that the media program is being presented via the first user viewing device, an ad programming signal is transmitted to the second user viewing device so as to present on the second user viewing device at least one first advertisement relating to content of the media program.

US Publication No. 2004/0117819 for "Apparatus for producing TV advertising contents and inserting interstitial advertisements on TV programs" by Ming-He Yu, filed Dec. 12, 2002, describes An apparatus and method for producing TV advertising contents and inserting interstitial advertisements on TV programs which is primarily used to interstitially insert the DIY audio, video, graphics, and texts onto ordinary TV programs, where the Data Storage Unit can record these audio/video and graphic/text data of ad contents. Users can store pictures and sounds captured by digital cameras or digital camcorders in the Data Storage Unit. The data of audio/video and graphic/text stored in the Data Storage Unit can be provided to the Video and Graphics Processing Unit for blending or overlaying, and be incorporated into the TV programs that are transferred from the Audio and Video Input Unit. The way to incorporate video for broadcasting includes to broadcast with two (or more than two) pictures (the pictures from Data Storage Unit and the picture of TV programs) blended, and to broadcast with Picture-in-Picture (PIP) overlay. In addition, it is available to insert captions or on-screen-displays through an User Interface Unit.

US Publication No. 2009/0320061 for "Advertising Based on Keywords in Media Content" by Bradley R. Pettit et al., filed Jun. 19, 2008, describes a trigger including both a criteria portion and a payload portion is accessed, the criteria portion identifying one or more criteria that includes a keyword, and the payload portion identifying one or more actions for presenting advertising content. Data corresponding to media content being presented is also accessed, and a check is made as to whether the data satisfies the one or more criteria. The one or more actions are performed in response to the data satisfying the one or more criteria. The trigger associating the advertising content with the keyword can be received in exchange for compensation.

US Publication No. 2011/0258049 for "Integrated Advertising System" by Jorey Ramer et al., filed Feb. 1, 2011, describes improved capabilities for selecting advertisements to be delivered to mobile communication facilities using a monetization platform that may act as an advertising hub. The monetization platform may interact with an ad exchange to collect relevant advertisements for delivery to the mobile communication facilities. The monetization platform may also facilitate the selection of advertisements through the ad exchange by associating advertisement requests with user, user profile or other mobile communication type information. Methods and systems of the present invention are described for aggregating mobile communication facility user profile data, including user profile data obtained from a mobile communication facility, the user's Internet usage, offline user data, and settop entertainment facility data relating to the user.

US Publication No. 2012/0180084 for "Method and Apparatus for Video Insertion" by Yu Huang et al., filed Dec. 30, 2011, describes a system and method that inserts a virtual image into a sequence of video frames. The method includes capturing geometric characteristics of the sequence of video frames, employing the captured geometric characteristics to define an area of the video frames for insertion of a virtual image, registering a video camera to the captured geometric characteristics, identifying features in the sequence of video frames to identify the defined area of video frames for insertion of the virtual image, and inserting the virtual image in the defined area. Vanishing points are estimated to determine the geometric characteristics, and the virtual image is blended with the area of video frames prior to inserting the virtual image in the defined area.

US Publication No. 2006/0026628 for "Method and apparatus for insertion of additional content into video" by Kong Wah Wan et al., filed Jul. 29, 2005, describes a method and apparatus inserts virtual advertisements or other virtual contents into a sequence of frames of a video presentation by performing real-time content-based video frame processing to identify suitable locations in the video for implantation. Such locations correspond to both the temporal segments within the video presentation and the regions within an image frame that are commonly considered to be of lesser relevance to the viewers of the video presentation. This invention presents a method and apparatus that allows a non-intrusive means to incorporate additional virtual content into a video presentation, facilitating an additional channel of communications to enhance greater video interactivity.

US Publication No. 2012/0215640 for "System for Targeting Advertising to Mobile Communication Facilities Using Third Party Data" by Jorey Rameret et al., filed Apr. 29, 2012 describes a system for targeting advertising content includes the steps of: (a) receiving first and second requests for advertising associated with first and second users, wherein the users are identified; (b) retrieving data pertaining to the users from a data provider; (c) selecting respective advertising content from the first and second sponsors based at least on a determination of relevancy of each advertising content to the data provider's data, wherein the relevancy determination generates respective relevancy scores; (d) determining the advertising content of the first sponsor is more relevant to the first user and the advertising content of the second sponsor is more relevant to the second user based on the respective relevancy scores; and (e) transmitting the advertising content of the first sponsor to the first mobile communication facility for display and transmitting the advertising content of the second sponsor to the second mobile communication facility for display.

U.S. Pat. No. 9,060,210 for "Generating excitement levels for live performances" by Warren Joseph Packard et al., filed Apr. 29, 2012 describes monitoring a live performance by analyzing an input data stream comprising real-time updates related to the live performance. Different sets of excitement levels, excitement curves, alerts and teasers are generated based on the analysis and reported to a plurality of subscribers using any of a variety of mobile communication and/or computing devices.

US Publication No. 2016/0132941 for "Apparatus and method for providing virtual advertisement" by Ju-Hyeun Han et al., filed Dec. 4, 2015, describes an apparatus and method for providing a virtual advertisement, and more particularly an apparatus and method that can determine the size of a virtual advertisement image to be inserted into a moving image while taking into account the size of an advertising region included in the moving image, that can select an appropriate virtual advertisement image based on the determined size of the virtual advertisement image, and that can measure the objective exposure level of a virtual indirect advertisement and calculate advertising expenses based on the measured objective exposure level. Furthermore, there are provided an apparatus and method that select a virtual advertisement image to be inserted into an advertising region while taking into account the size of a virtual advertising region that varies depending on the angle of a camera or the posture of a virtual advertisement object.

US Publication No. 2015/0215605 for "Virtual advertising platform" by inventor Karel Paul Stephan filed Apr. 9, 2015, describes a virtual advertising platform may use a three-dimensional mapping algorithm to insert a virtual image within a digital video stream. The virtual advertising platform may apply a three-dimensional mapping algorithm to the virtual digital image, wherein the three-dimensional mapping algorithm causes the virtual digital image to be recomposited within a plurality of frames within a received two-dimensional digital data feed in place of a spatial region within the two-dimensional data feed. The mapping algorithm may enable application of analogous geometric changes to the virtual digital image that are present in the spatial region within the plurality of video frames within the two-dimensional digital video data feed, and may send the recomposited digital data feed for display to a user, wherein the recomposited digital data feed is a virtualized digital data feed that includes the virtual digital image in place of the spatial region.

SUMMARY OF THE INVENTION

In one embodiment, the present invention provides systems and methods for real-time bidding of advertisement locations during live event broadcasting. Intensity levels for different moments of a live event are calculated based on analytical data of the live event. A broadcaster computer automatically opens at least one advertisement location during a specific moment in the live event broadcasting for auction in real time at least based on an intensity level for the specific moment. Different bidder computers automatically bid for the at least one advertisement location on the screen during the specific moment in real time based on the intensity level, audience targeting information, and their bidding settings. In one embodiment, the present invention provides analytics for key audience segments for a broadcaster who then provides audience targeting information for bidders. In another embodiment, a third party provides audience targeting information for broadcasters and/or bidders. At least one advertisement from at least one winning bidder is displayed at the at least one advertisement location on the screen during the specific moment of the live event broadcasting. A dynamic digital graphic element is overlaid on the video images of the live event broadcasting during the specific moment representing an advertisement for the winning bidder. During the live event broadcasting, there are multiple moments for real-time bidding for at least one advertisement location, and digital graphic elements representing winning advertisements are overlaid at the at least one advertisement location on the video images during these multiple moments respectively.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1 is a schematic diagram of a cloud-based system of the present invention.

DETAILED DESCRIPTION

The present invention is directed to systems and methods for advertising during live event broadcasting. Intensity levels for different moments of a live event are calculated, and a location on the video images of the live event broadcasting from one broadcaster is up for auction during these different moments. Various advertisers bid in real time for the location on the video images of the live event broadcasting for advertisements during these different moments. The value of the location on the video images of the live event broadcasting during a specific moment is at least based on an intensity level of that moment in the live event. A dynamic graphic element representing an advertisement from a winning bidder is displayed as an overlay at the location on the video images of the live event broadcasting during a specific moment.

The present invention provides systems and methods for advertising during live sporting event broadcasting. At least one broadcaster computer and at least one advertiser computer is in network communication with a server platform. The at least one broadcaster computer is operable to broadcast video images of a live sporting event and select at least one location of the video images for advertisement bidding for at least one moment of the live sporting event. The server platform calculates an intensity level for at least one moment of the live sporting event based on real-time data, historical data, statistical data, and prediction data regarding to the live sporting event. The at least one broadcaster computer determines an ask value for the at least one location on the video images for the at least one moment of the live sporting event based on the intensity level. The at least one advertiser computer automatically places at least one bid value for the at least one location on the video images at the at least one moment of the live sporting event for advertisement based on the intensity level and audience targeting data. The server platform overlays at least one graphical element representing at least one advertisement from at least one bid-winning advertiser computer on the video images of the live sporting event at the at least one moment in real time. The server platform facilitates transactions for advertising at the at least one location of the video images for the at least one moment of the live sporting event between the at least one broadcaster computer and the at least one bid-winning advertiser computer.

A live event refers to any live action that has an element of uncertainty, suspense, surprise, or competition, for example but not for limitation, sporting events, beauty pageants, political rallies, etc. Preferably, the present invention is directed to systems and methods for advertising in live sporting event broadcasting. For example, and not for limitation, sporting events includes American football, basketball, baseball, golf, soccer, tennis, rugby, hockey, cricket, volleyball, horse racing, auto racing, boxing, mixed martial arts, swimming, track and field, and any other sports event. During a live event, there are moments more intense than others. For example, a touchdown run in an NFL football game, overtime or the last few minutes in an NBA basketball game, a potential triple play in a MLB baseball game, etc. People who are interested in the live event may not want to or have time to sit through the whole event, but they do not want to miss out on the intense moments. Thus, these live intense moments draw a lot more attention from viewers and are great opportunities for advertisements.

The live event broadcasting is via traditional TV network programs, in-stadium displays, social media streaming (e.g., YOUTUBE, FACEBOOK, TWITTER, etc.), virtual reality broadcasting, augmented reality broadcasting, etc.

The location on the video images of the live event broadcasting for advertisement is preferably based on the location of audience attention. In one embodiment of the present invention, the advertisement location is a fixed and designated spot. For example, the fixed and designated spot is right next to a score bug or score banner. The score bug or score banner is a digital on-screen graphic displayed at either the top or lower third bottom of a display screen during a sporting event broadcasting in order to display the current score and other statistics. In another embodiment of the present invention, the location for advertisement is variable. For example, the location for an advertisement is related to the location of participants and/or instruments in an intense instance of a live event. For example, and not for limitation, the live event is a football game, and an intense instance is a touchdown run. The location for advertisement is on or around the football player running for a touchdown.

Advertisers bid for the location for advertisements in live event broadcasting. In one embodiment, the present invention provides an ad exchange platform for real-time auction and bidding. Various advertisers are enabled to bid over the ad exchange platform for advertisement locations from different broadcasters for advertisements based on intensity levels of a live event, and an advertisement from a winning bidder is displayed on screen at an advertisement location on the video images of the live event broadcasting from a broadcaster during a specific moment.

The ad exchange platform facilitates the buying and selling of media advertising inventory from multiple broadcasters. Prices for the inventory are determined through bidding. Real-time bidding is a means by which advertising inventory is bought and sold via programmatic instantaneous auctions. During a real-time bidding, advertising buyers bid on an advertisement location. An advertisement from a winning bidder is instantly displayed on the advertisement location on the video images of the live event broadcasting.

In one embodiment of the present invention, bidders for advertisement include advertisers, advertising agencies, and any other entities who buy advertisement space for certain products, services or events; and sellers for advertisement space on the screens include broadcasters, live streaming platforms, and other entities who provide screen space for advertisements in live event broadcasting.

In one embodiment, the present invention provides a graphical user interface (GUI) for the bidders to interact with the ad exchange platform, and manage their bids and accounts. The bidder GUI is in the form of a webpage login or an application program. Real-time bidding for advertisements takes place within the ad exchange platform, and bidders are operable to manage their bids for advertisement spots via the bidder user interface. For example, and not for limitation, the bidders are enabled via the bidder GUI to set bidding prices, maximum bidding prices, advertisement budget, and etc. The ad exchange platform of the present invention is operable to provide analytical data for audience targeting, and the bidder GUI provides bidders access to analytical data for better targeting in advertisement. The bidder GUI further enables bidders to monitor and optimize advertisement campaign performance.

In one embodiment, the present invention provides a graphical user interface (GUI) for the sellers of advertisement space during live event broadcasting to interact the ad exchange platform, manage advertising space inventory, fill the screen space with advertisements, and receive revenue. The seller GUI is in the form of a webpage login or an application program. The sellers of advertisement space are enabled via the seller GUI to automate and optimize the selling of advertisement space during live event broadcasting.

In one embodiment, dynamic graphic elements representing advertisements from the winning bidders are overlaid on the video images of the live event broadcasting during specific moments. In one embodiment, a dynamic graphic element is a logo or a tagline for a product, a service or an event; the dynamic graphic element is overlaid at the designated location on the video images of the live event broadcasting during a specific moment. When a different advertiser wins the bidding for the designated location at a different moment, a different graphic element is overlaid and displayed at the designated location on the video images of the live event broadcasting at that different moment.

In a live event, such as a sporting event, there are intense moments or highlights. In one embodiment, the present invention provides an analytics platform with a rules engine. The rules engine includes a set of rules for rating different moments during a live sporting event based on analytics and predictions. The analytics and predictions are based on real-time data collected from athletes, sporting instruments, videos, and other input data automatically or manually collected from the live sporting event. The analytics and predictions are also based on statistical data for athletes from past events. The advanced data analytics is described in U.S. Patent Publication No. 2017-0259115 by common assignee SportsMEDIA Technology Corporation, and is incorporated herein by reference in its entirety.

For example, the present invention is operable to predict a triple play in a baseball game based on the scores and positions of players in the baseball game, trajectory of the baseball, and/or statistical data for the batter. When there are no outs with two runners on the first base and the second base, and when the batter hits a ground ball, there is a high probability for a triple play and the intensity during this moment is high. A broadcaster of this baseball game is operable to open up an advertisement location on the video images of the live baseball game broadcasting for advertisement bidding in real time. Alternatively, an application recognizes that the probability for a triple play meets or exceeds a threshold or that a triple play is occurring. The application program uses statistics and analytics described in U.S. Patent Publication No. 2017-0259115 to determine the probability exceeds a threshold or that a triple play is occurring. An advertisement from the winning bidder is displayed at the advertisement location on the video images of the live baseball game broadcasting.

In one embodiment, there is an instant replay for highly intense moments. The advertisement overlaid on the video images of live event broadcasting is also displayed in the instant replay, which makes the broadcast time for the intense moments longer, and the advertisement location on the video images of the live event broadcasting during the intense moments more valuable. Alternatively, if the highly intense moment does not permit enough time for an advertisement to be shown in real-time when the highly intense moment occurs, an advertisement from the winning bidder is displayed at the advertisement location on the instant reply. In yet another embodiment, bidding parameters for a highly intense moment include bidding for an advertisement to be shown in real-time when the highly intense moment occurs and bidding for the advertisement to be shown in the instant reply.

An intensity level is a rating given to a moment in a live event. In one embodiment, the intensity level is on a scale of 0 to 100, with 0 for the least intense moment and 100 being the most intense moment. In another embodiment, the intensity level is on a scale of 0 to 10, with 0 for the least intense moment and 10 being the most intense moment. In yet another embodiment, the intensity level is on a scale of 0 to 1, with 0 for the least intense moment and 1 being the most intense moment. The intensity levels are calculated by considering different elements with different weighting factors for a specific event. Elements include, but are not limited to, a presence of a star player, the presence of a certain percentage of star players, a small difference in score numerically or by percentage, a short amount of time on the game clock, a short amount of time on a shot clock, a high number of fouls or penalties on one or more players, a final game in a series or a pivotal game in a series (ex: one team must win for the next game in the series to be played), historical and probabilistic statistics including: a likelihood of one or more players making clutch plays during a predetermined time period such as the last quarter of a game, the last few minutes of a game, the last minute of a game, etc., a shooting percentage, steal percentage, shot block percentage, assist percentage, or other offensive or defensive statistic for the relevant portion of a game, a possibility or likelihood of a team winning a game they have never won before or haven't won in a certain amount of time, a possibility or likelihood of a team winning a game to keep a winning streak against a team or an overall winning streak alive, the final game or potential final game of a collegiate athlete, the final game or potential final game of a professional athlete, a final game or potential final game of a coach, the final game or potential final game of a player for a team, a rivalry ranking between the teams, a potentially record breaking statistic such as a record number of points, blocks, steals, shots, sacks, tackles, interceptions, receptions, yards, goals, saves, touch downs, dunks, three point shots, free throws, double doubles, triple doubles, strike outs, assists, home runs, or any other offensive or defensive statistic for a team, a game, a season, or a league, and any other historical or probabilistic statistic. Preferably, certain historical or probabilistic statistics are weighted more heavily than others in determining the intensity level and/or a starting bid for advertising during the moment at the live event.

In one embodiment, the present invention provides intensity levels for different moments in a live event in real time for a broadcaster. The broadcaster opens an advertisement location on the video images of the live event broadcasting during a moment, and lists the advertisement location for real-time bidding on an ad exchange platform. The specific broadcaster is operable to set a starting bid for the advertisement location available during the moment based on the intensity level. In one embodiment, the ad exchange platform displays an intensity level of specific moments for each open advertisement location on video images of the live event broadcasting.

In one embodiment of the present invention, a live event is divided into fixed and equal time intervals, each moment has the same length timewise and has an intensity level. In another embodiment, the live event is marked by intensity levels with different time intervals depending on the length of specific events happening during different moments. For example, a touchdown run just lasts a couple of seconds with an intensity level 90. Also for example, there are moments a few minutes long without anything intense happening, having an intensity level 10.

In one embodiment, the present invention provides a real-time alert of an intensity level for advertisers through the bidder user interface. The advertisers are enabled to set an intensity level threshold above which they are interested in via the bidder user interface. The advertisers are then enabled to bid for an advertisement location with an intensity level above the threshold for a certain event on certain broadcaster during a certain moment manually or automatically. For example, an advertiser for DORITOS® is only interested in intensity levels above 80 in an NFL football game on NBC. When the advertiser computer receives an alert, or identifies an intensity level above the threshold value for an advertisement location in a live event broadcasting via the bidder user interface, it automatically bids for the advertisement location. The present invention is operable to place an advertisement for a successful bidder as an overlay at the advertisement location on the video images of the live event broadcasting in real time.

In one embodiment, the present invention provides a real-time alert of intensity level for viewers through an application program associated with a specific broadcaster. The viewers are operable to set an intensity level threshold above which they are interested in. For example, a viewer is only interested in moments with intensity levels above 75 in an NFL football game. In one embodiment, an application automatically sends these clips to a viewer in an electronic communication in real-time. Alternatively, an application compiles clips of intensity levels above a certain threshold and sends these clips to a viewer in an electronic communication after the game. In one embodiment, the viewer receives these clips through an application on an electronic communications device. Alternatively, the viewer receives these clips as an attachment to an electronic message such as an email, via a hyperlink in an electronic message, or embedded in an electronic message. The viewer is also operable to receive the clips via a multimedia message service (MMS) on a mobile device. The application is also operable to send a clip or a compilation of clips with intensity levels above a certain threshold to an in-stadium display and/or to a social media feed such as FACEBOOK or TWITTER. The application converts the clip or compilation of clips to a different file format before sending the clip or compilation of clips to another device in another embodiment. In yet another embodiment, the application is operable to capture still images or shorter clips such as GIFS from the clip or compilation of clips and send these images or GIFS to another device or a social media feed. Preferably, the overlaid advertisements are included in the clip or the compilation of clips, which further increase the value of the advertisement locations.

In one embodiment of the present invention, the intensity levels are provided for selective view after live broadcasting. For example, a live event is broadcasted and recorded by a broadcaster, and a whole video or separate video clips are posted on the broadcaster's website or application program with intensity level information. The intensity level information is presented in an intensity curve or an intensity table. Advertisements placed at moments with higher intensity levels have higher chance for replay later. Thus, these advertisements get more attention from more viewers, and are more valuable.

In another embodiment, intensity levels are aligned with a usage chart for a specific sporting event along a timeline. Detailed descriptions for the usage chart is provided in U.S. patent application Ser. No. 15/915,771 filed Mar. 8, 2018 by common assignee SportsMEDIA Technology Corporation and is hereby incorporated herein by reference in its entirety. Advertisers are enabled to see the intensity levels with other statistical data during a certain period of time, and make better decisions for advertisement bidding. Viewers are enabled to see the intensity levels and the statistical data for more insights and better engagement into the sporting event. Commentators are enabled to comment on specific moments with quantifying intensity levels and draw more attention from viewers.

In targeted marketing, audiences or viewers are segmented based on demographic data (e.g., age, level of education, income, ethnicity, gender, etc.), geographic data (e.g., region, county, census tract, etc.), psychographic data (personality, values, attitudes, interests, level of readiness for change and lifestyles, etc.), delivery channels for the broadcast (TV, mobile streaming, desktop streaming, etc.), and any other relevant data. These data are collected from cable TV providers, internet service providers, mobile data providers, and other parties who possess viewership data.

In one embodiment, the present invention provides analytics of key audience segments for broadcasters in order to provide better audience insights. The better the audience insights are, the better advertisers know about the values of the advertisement space to them. In one embodiment, the broadcasters are enabled to offer one advertisement location on video images of live event broadcasting for different key audience segments during a specific moment. For example, and not for limitation, one advertisement location on the screen is open for a moment with an intensity level 90 during a live event, there are two different bids open for two different key audience segments A and B. Advertisers interested in key audience segment A bid for the advertisement location for key audience segment A. Advertisers interested in key audience segment B bid for the advertisement location for key audience segment B. As a result, there is a winner for the advertisement location for each key audience segment, and there are two different advertisements for the same moment with the intensity level 90 broadcasting to the two different key audience segments respectively. For example, at a touchdown run moment in an NFL football game, a Subaru advertisement won the bidding for urban audience and is broadcast to the urban audience, and a Ford F150 advertisement won the bidding for rural audience and is broadcast to the rural audience. In another embodiment, the present invention provides for simultaneous bidding across audience segments, with the winning bidder showing different advertisements for different audience segments. Using the example above, if Subaru wins bids for audience segments A and B, Subaru's advertisement for a Subaru Impreza is shown to audience segment A and Subaru's advertisement for a Subaru Forester is shown to audience segment B.

Alternatively, delivery channels are segmented into delivery channel segments based on the mechanism for delivery of the broadcast, such as TV, online streaming, and in-stadium display. These delivery channel segments include delivery channel sub-segments in another embodiment of the present invention. By way of example, online streaming is broken down by websites offering online streaming, mobile app vs. desktop screening, etc.

In another embodiment, the present invention provides the analytics of key audience segments to the advertisers directly for better targeted advertisement bidding. In another embodiment, broadcasters and advertisers get access to the analytics of key audience segments from a third party.

In one embodiment, the present invention provides a cloud-based platform for data analytics and advertisement in live event broadcasting. The cloud-based platform is associated with different databases including databases storing real-time data related to events, participants, and instruments of a live event, databases storing historical data related to similar events and participants, databases storing viewership data, and etc. The cloud-based platform is operable to provide analytics based on all the accessible data and predetermined rules, determine intensity levels for different moments in a live event, and analyze audience targeting information. The cloud-based platform is further operable to provide an advertisement exchange for broadcasters and advertisers. The broadcasters open and list advertisement locations on the advertisement exchange via a seller user interface in real time based on intensity levels during different moments of live event broadcasting. The advertisers bid for the advertisement locations in real time via a bidder user interface. The cloud-based platform is further operable to overlay a dynamic graphic element for an advertisement of the winning bidder at the location on the video images of the live event broadcasting.

Referring now to the drawings in general, the illustrations are for the purpose of describing a preferred embodiment of the present invention and are not intended to limit the present invention thereto.

FIG. 1 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 1, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 1, may include other components that are not explicitly shown in FIG. 1, or may utilize an architecture completely different than that shown in FIG. 1. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the present invention provides systems and methods for real-time bidding of advertisement locations during live event broadcasting. Intensity levels for different moments of a live event are calculated based on analytical data of the live event. A broadcaster computer automatically opens at least one advertisement location during a specific moment in the live event broadcasting for auction at least based on an intensity level for the specific moment. Different advertiser computers automatically bid for the at least one advertisement location on the screen during the specific moment in real time based on the intensity level, audience targeting information and their bidding settings. In one embodiment, the present invention provides analytics for key audience segments for a broadcaster who then provides targeting information for bidding advertisers. In another embodiment, a third party provides audience targeting information for broadcasters and/or advertisers. At least one advertisement from at least one winner is displayed at the at least one advertisement location on the video images of the live event broadcasting during the specific moment. A dynamic digital graphic element is overlaid on the video images of the live event broadcasting during the specific moment representing a winner advertisement. During the live event broadcasting, there are multiple moments for bidding the advertisement location. Different digital graphic elements representing different winning advertisements are overlaid at the advertisement location on the video images of the live event broadcasting during these multiple moments respectively.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:
1. A system for determining intensity levels during live sporting event broadcasting, comprising:
  a server platform in network communication with at least one broadcaster computer and at least one advertiser computer;
  wherein the server platform is operable to calculate an intensity level for at least one moment of a live sporting event;
  wherein the server platform is further operable to provide data analytics on at least one key audience segment to the at least one broadcaster computer;
  wherein the at least one broadcaster computer is operable to provide the data analytics on the at least one key audience segment to the at least one advertiser computer;
  wherein the intensity level is a rating given to the at least one moment of the live sporting event based on real-time data and historical data, statistical data, and/or prediction data;
  wherein the real-time data includes data related to events and/or participants in the live sporting event;
  wherein the intensity level is a value measuring the likelihood of exciting imminent events in the live sporting event, including a likelihood of an upcoming type of play and/or a likelihood a particular player taking specific actions;
wherein the server platform is operable to receive an ask value for at least one location on video images for the at least one moment of the live sporting event from the at least one broadcaster computer, wherein the ask value is based on the intensity level and the key audience segment; and
wherein the at least one location on the video images for the at least one moment of the live sporting event is fixed and designated in accordance with a score bug or a score banner, wherein the score bug or the score banner is a digital on-screen graphic displayed during the live sporting event to show the current score or other statistics.

2. The system of claim 1, wherein the server platform is operable to overlay at least one graphical element representing at least one advertisement from at least one bid-winning advertiser computer on the video images for the at least one moment of the live sporting event.

3. The system of claim 2, wherein the server platform is operable to receive at least one bid value for an instant replay of the at least one moment of the live sporting event independently from the at least one bid value for the at least one moment of the live sporting event, wherein the at least one graphical element is displayed in the instant replay of the at least one moment of the live sporting event.

4. The system of claim 1, wherein the at least one location on the video images for the at least one moment of the live sporting event is variable based on the live sporting event.

5. The system of claim 1, wherein the server platform is operable to facilitate a transaction for advertising on the at least one location on the video images for the at least one moment of the live sporting event between the at least one broadcaster computer and at least one bid-winning advertiser computer.

6. The system of claim 1, wherein the at least one advertiser computer is operable to manage bids and accounts on the server platform via a bidder graphical user interface (GUI), and wherein the at least one advertiser computer is further operable to monitor and optimize advertisement campaign performance via the bidder GUI.

7. The system of claim 1, wherein the at least one advertiser computer places at least one bid value based on audience targeting data, wherein the audience targeting data includes psychographic data.

8. The system of claim 1, wherein the real-time data is collected from athletes, sporting instruments, and videos automatically or manually via input capture devices for the live sporting event.

9. The system of claim 1, wherein the server platform further comprises a seller graphical user interface (GUI), wherein the seller GUI enables the at least one broadcaster computer to interact with the server platform, wherein the at least one broadcaster computer can manage space inventory, fill the screen space with advertisements, and/or receive revenue via the seller GUI, wherein the at least one broadcaster computer can automate and optimize the selling of advertisements during the at least one moment of the live sporting events, and wherein the seller GUI is accessed through a web page login or an application.

10. A system for determining intensity levels during live sporting event broadcasting, comprising:
a server platform in network communication with a multiplicity of broadcaster computers and a multiplicity of advertiser computers;
wherein the server platform is operable to calculate an intensity level for at least one moment of a live event;
wherein the intensity level is a rating given to the at least one moment of the live sporting event based on real-time data and historical data, statistical data, and/or prediction data;
wherein the intensity level is a value measuring the likelihood of exciting imminent events in the live sporting event, including a likelihood of an upcoming type of play and/or a likelihood a particular player taking specific actions;
wherein the real-time data includes data related to events and/or participants in the live sporting event;
wherein the server platform is operable to receive an ask value for at least one location on video images for the at least one moment of the live event from the multiplicity of broadcaster computers, wherein the ask value is based on the intensity level; and
wherein the at least one location on the video images for the at least one moment of the live sporting event is fixed and designated in accordance with a score bug or a score banner, wherein the score bug or the score banner is a digital on-screen graphic displayed during the live sporting event to show the current score or other statistics.

11. The system of claim 10, wherein the server platform is operable to overlay at least one graphical element representing at least one advertisement from at least one bid-winning advertiser computer on the video images of the live event for the at least one moment in real-time.

12. The system of claim 10, wherein the intensity level is based on event-specific weighting factors for a presence of at least one event element and an event context for the at least one event element, wherein weighting factors based on historical statistics are weighted more heavily than other weighting factors.

13. The system of claim 10, wherein the server platform is operable to facilitate transactions for advertising on the at least one location on the video images for the at least one moment of the live event between the multiplicity of broadcaster computers and at least one bid-winning advertiser computer.

14. The system of claim 10, wherein the live event is divided into fixed and equal moments, and wherein each moment has the same length timewise and has an intensity level.

15. The system of claim 10, wherein the live event comprises variable moments depending on lengths of specific events happening during different moments.

16. The system of claim 10, wherein the server platform is operable to send a real-time alert when the intensity level is above a predetermined threshold to the multiplicity of advertiser computers via a bidder user interface, and wherein at least one advertiser computer bids for the at least one moment of the live event that is above the predetermined threshold.

17. A method for advertising during live sporting event broadcasting, comprising:
providing a server platform in network communication with at least one broadcaster computer and at least one advertiser computer, wherein the at least one broadcaster computer is operable to broadcast video images of a live sporting event;
the server platform calculating an intensity level for at least one moment of the live sporting event based on real-time data, historical data, statistical data, and/or prediction data relating to the live sporting event;

wherein the real-time data includes data related to events and/or participants in the live sporting event, and wherein the prediction data includes predictions of likelihoods of imminent gameplay events;

wherein the intensity level is a rating given to the at least one moment of the live sporting event further based on event-specific weighting factors for a presence of at least one event element and an event context for the at least one event element;

wherein the intensity level is a value measuring the likelihood of exciting imminent events in the live sporting event, including a likelihood of an upcoming type of play and/or a likelihood a particular player taking specific actions;

the server platform receiving an ask value for at least one location on video images for the at least one moment of the live sporting event from the at least one broadcaster computer;

wherein the ask value is based on the intensity level; and wherein the at least one location on the video images for the at least one moment of the live sporting event is fixed and designated in accordance with a score bug or a score banner, wherein the score bug or the score banner is a digital on-screen graphic displayed during the live sporting event to show the current score or other statistics.

18. The method of claim 17, further comprising the at least one broadcaster computer opening a multiplicity of bids for the at least one location on the video images for the at least one moment of the live sporting event, wherein the at least one broadcaster computer shows at least two different key audiences at least two different advertisements at the same at least one location at the same at least one moment of the live sporting event, wherein the at least two different key audiences are based on audience segmentation data, and wherein the audience segmentation data comprises demographic data, geographic data, psychographic data, and/or delivery channels for the broadcasting the live sporting event.

19. The method of claim 17, wherein the event-specific weighting factors for a presence of at least one event element and an event context for the at least one event element comprise: presence of a star player, presence of a certain percentage of star players, a small numeric difference in score, a small percentage difference in score, a short amount of time on a game clock, a short amount of time on a shot clock, a high number of fouls or penalties on one or more players, a final game in a series, and/or a pivotal game in a series.

* * * * *